Patented Mar. 14, 1933

1,901,410

UNITED STATES PATENT OFFICE

EMIL POEGEL, OF NEWARK, NEW JERSEY

COATING FOR BUILDINGS AND METHOD FOR MAKING SAME

No Drawing.   Application filed May 31, 1930.   Serial No. 458,891.

This invention relates to improvements in water-proofing and fire-proofing buildings and the method of making the same, particularly to a material for water- and fire-proofing bricks, cement-blocks or stucco, etc. in buildings, and the method for making said material, and it is the principle object of my invention to provide a coating preventing deterioration of these buildings or materials under the influence of weather.

Another object of my invention is the provision for iron or the like to make the same rust proof.

A further object of my invention is the provision of a simple and inexpensive coating for building material, yet durable and efficient in protecting said material against deteriorating influence of the weather and changes in temperature.

A still further object of my invention is the provision of a coating for buildings that will restore the natural appearance of said buildings, inasmuch as saltpeter and the like will be caused to disappear.

Yet another object of my invention is the provision of a novel and improved method for making such water- and fire-proofing compound or coating in a simple manner and to produce a coating which can readily be applied to buildings.

These and other objects and advantages of my invention will become more fully known as the description thereof proceeds and will then be specifically defined in the appended claims.

With these objects in view, I use a mixture of liver oil, bee's wax, and acid acetic glacial, consisting of one gallon of for instance cod-liver oil to three quarters of a pound of bee's wax and twelve ounces of acid acetic glacial (99% U. S. P. X.)

I prepare this mixture by boiling the liver oil and adding to the same the bee's wax and acid acetic glacial, whereafter the mixture is allowed to cool off and it is then ready for application to buildings of brick, cement, stone, stucco etc. The coating is applied with brush, spraying machine, or the like.

The coating of said material will restore their natural appearance to said buildings, as saltpeter and similar exudations will disappear. It will also make the buildings water- and fire-proof.

If the coating is to be used for making iron rust-proof I use a mixture of one gallon of cod liver oil with three quarters of a pound of bee's wax and four ounces of acid acetic glacial.

While the proportions of the ingredients have shown to give the best practical results, it will be understood that I may make such changes therein and in the manner or method of preparing same, as come within the scope of the appended claims without departure from the spirit of my invention and the principles involved.

I claim:

1. A coating for weatherproofing buildings comprising a cod liver oil base, a bee's wax filler, and acid acetic glacial.

2. A composition for water- and fire-proofing bricks, cement, stones, slabs and stucco and buildings constructed of same, containing one gallon of cod liver oil, three quarters of a pound of bee's wax, and twelve ounces of acid acetic glacial.

3. A composition for restoring buildings to their original, natural appearance, consisting of one gallon of cod liver oil, three quarters of a pound of bee's wax and twelve ounces of acid acetic glacial.

4. A composition for making iron rust-proof consisting of one gallon of cod liver oil, three quarters of a pound of bee's wax and four ounces of acid acetic glacial.

In witness whereof I have signed my name to this specification.

EMIL POEGEL.